Sept. 3, 1968     B. D. HRYNIOWSKI     3,399,771

DISTRIBUTORS OF MATERIAL

Filed July 26, 1966     2 Sheets-Sheet 1

INVENTOR
BOHDAN D. HRYNIOWSKI

ATTORNEY

Sept. 3, 1968        B. D. HRYNIOWSKI        3,399,771
DISTRIBUTORS OF MATERIAL

Filed July 26, 1966        2 Sheets-Sheet 2

INVENTOR
BOHDAN D. HRYNIOWSKI

ATTORNEY

United States Patent Office 3,399,771
Patented Sept. 3, 1968

3,399,771
DISTRIBUTORS OF MATERIAL
Bohdan D. Hryniowski, 3078 Marcel Ave.,
St. Laurent, Quebec, Canada
Filed July 26, 1966, Ser. No. 567,878
12 Claims. (Cl. 209—245)

ABSTRACT OF THE DISCLOSURE

A material distributor for distributing material equally in all directions from a feeding means. The distributor comprises a round plate centrally located with respect to a material inlet duct. Both the duct and the plate are vibrated to ensure that the material flows evenly from the duct onto the plate and also to ensure that the material is distributed evenly off the plate. The distributor is provided with means either within the duct or as a result of the spacing between the duct and the plate for controlling the flow of the material from the duct onto the plate.

---

This invention relates to distributors for material.

Difficulties have heretofore been encountered in the operation of mechanical separators which sieve material to separate the coarse material from the fine material. The main difficulty which arises is that the material separators are used in banks of four or more and uneven distribution of material between these separators occurs. For example, in extreme circumstances one separator may be handling 75% of the incoming material and the remaining separators may be handling the remaining 25% between them.

In accordance with the present invention there is provided a material distributor which is adapted to be connected between the source of supply and the material separators and which serves to divide material evenly between the separators.

This distributor includes a material distributor comprising an inlet port, a material receiving plate onto which material entering the distributor through said inlet port falls, means for imparting horizontal gyratory and vertical oscillatory motions to said plate to cause material present on said plate to be propelled across the upper surface of the plate, and a plurality of outlet ports disposed in an array with respect to said plate to receive material from said plate.

Figure 1:
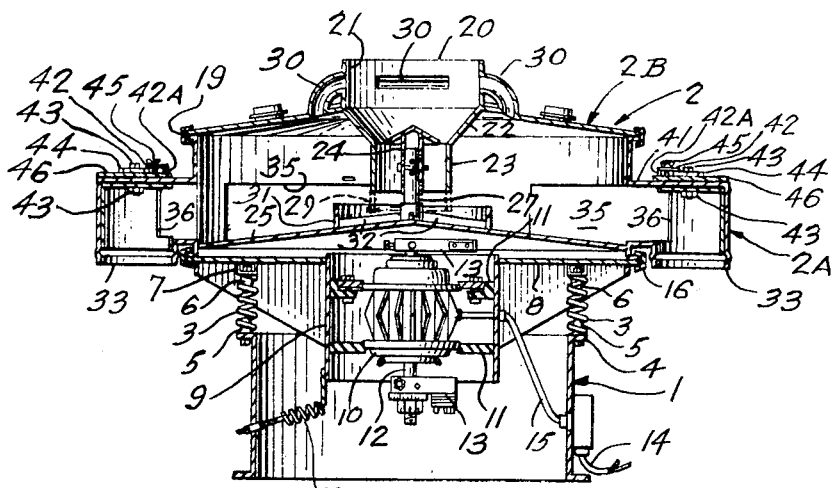
Figure 2:
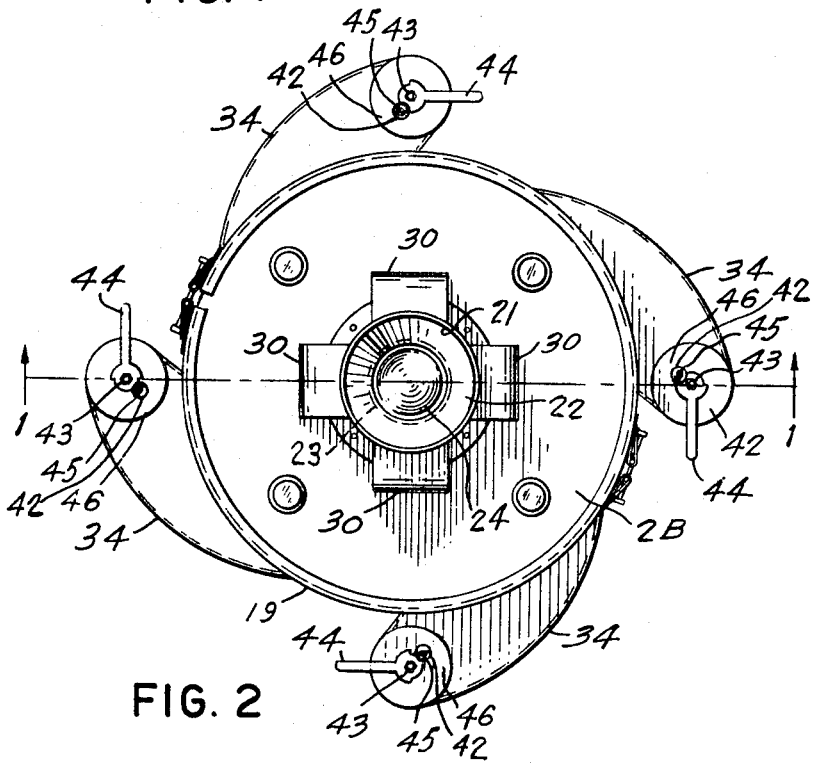
Figure 3:
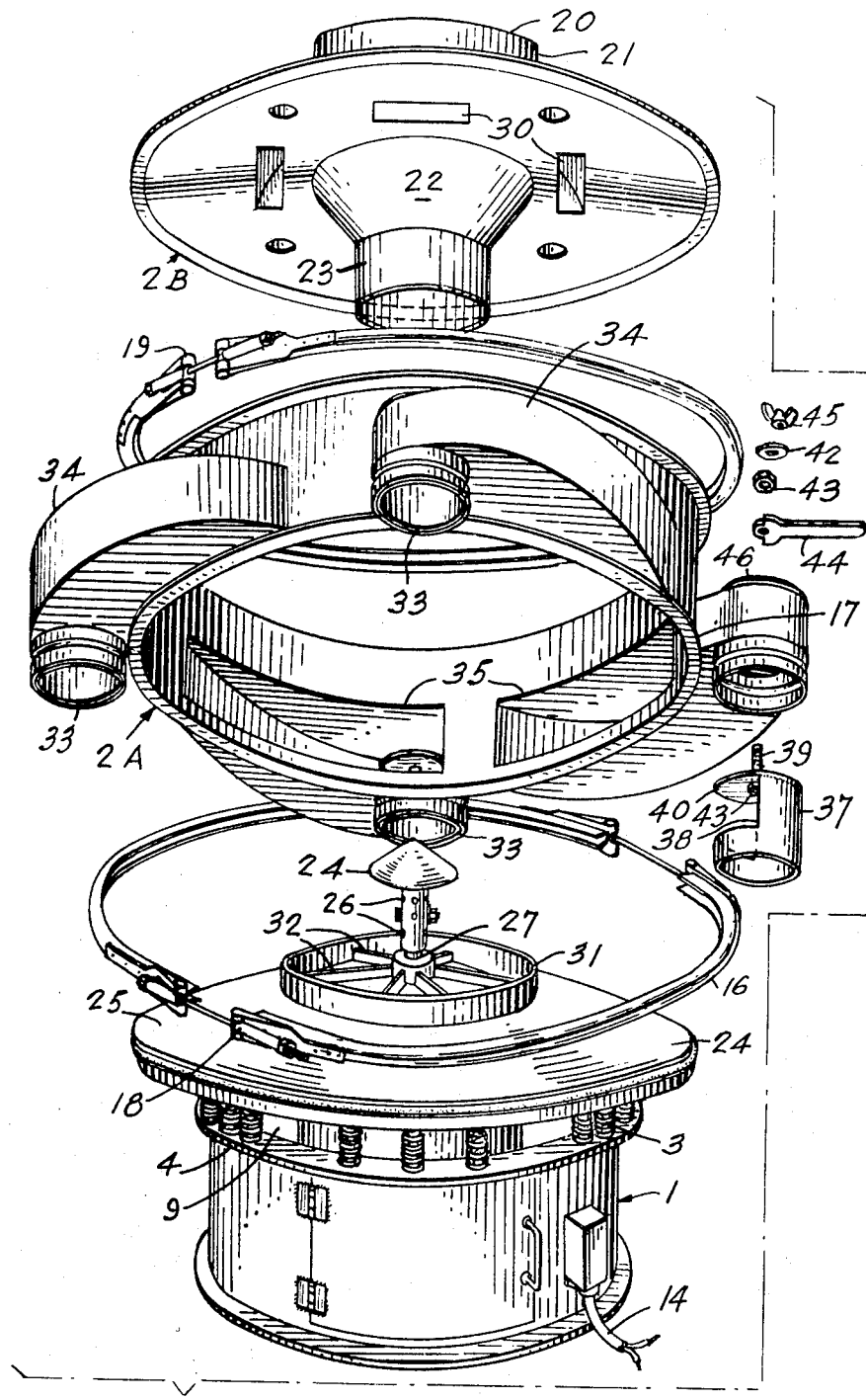

The invention will now be described in detail with reference to the accompanying drawings in which:

FIGURE 1 is a vertical cross section of a material distributor according to the present invention, FIGURE 2 is a plan view of the material distributor of FIGURE 1, and FIGURE 3 is an "exploded" perspective view of the material distributor of FIGURE 1.

The distributor illustrated includes a base casing 1 and an upper casing 2, the upper casing 2 being mounted on the base casing 1 by means of a series of springs 3 so that the casing 2 "floats" on the casing 1. Cellular rubber or gas filled resilient mounts could be employed in place of the springs 3.

More specifically, the casing 1 has an outwardly directed rim 4 with a series of upwardly directed rubber bosses 5 secured to the rim 4, and the casing 2 has a corresponding series of downwardly directed rubber bosses 6 mounted on a member 7 which itself is secured to the underside of a floor 8 forming part of the casing 2. Corresponding bosses are entered in opposed ends of the springs 3.

A cylindrical housing 9 is integral with the inner periphery of the annular floor 8 and depends therefrom. The housing 9 has an electric motor 10, mounted therein, the motor being supported on metal ledges 11. The shaft of the motor, referenced 12 carries eccentric weights 13 at each end thereof, the weights 13, upon rotation of the shaft 12 of the motor 10, serving to cause the entire motor, the housing 9 and the upper casing 2 to perform a horizontal gyratory motion and a simultaneous vertical oscillatory vibration. The electrical power supply for the motor 10 is illustrated at 14 and 15, the cable 15 being looped to avoid breakage thereof as a result of fatigue caused by the vibration.

The upper casing 2 includes the floor 8, an intermediate casing part 2A and an upper casing part 2B. A clamping ring 16 (see particularly FIGURE 3) is provided for releasably securing the floor 8 to the casing part 2A, the casing part 2A for this purpose being provided with an outwardly directed flange 17 to which the clamping ring 16 secures the outer periphery of the floor 8. The ring 15 includes a tightening arrangement 18. In a similar manner a further clamping ring 19 releasably secures juxtaposed portions of the casing parts 2A and 2B.

The upper end of the casing part 2A is in the form of an inlet hopper 20, the upper part 21 of the hopper 20 being cylindrical (or conical) in form and leading to a downwardly converging cone 22 which in turn leads to another cylindrical portion 23. A valving or controlling arrangement is provided for regulating the flow of material from the cone 22, through the portion 23 and into the interior of the casing 2. Several types of valving arrangements are suitable and in the illustrated embodiment a "mushroom" 24 is provided, the mushroom 24 being mounted on a pyramid shaped floor 25 of the casing part 2A. The floor could also be pyramidal, flat, concave or convex. The mushroom 24 is provided with a series of holes 26 and is mounted on a rod 27 extending upwardly from the apex of the floor 25, the rod 27 having a corresponding series of holes. By engaging a pin 28 in different holes in the mushroom 24 and rod 27 the height of the mushroom 24 can be adjusted. This effectively varies the width of the annular gap between the mushroom 24 and the cone-shaped section 22.

Alternatively, the mushroom 24 can be omitted and a series of annular rings can be mounted on the lower end of the portion 23. For example, a series of rings having an axial width of one half inch can be suspended one below the other. One ring 29 is indicated in phantom in FIGURE 1. By removing one or more of these rings the width of the gap between the lowermost ring and the floor 25 (through which gap the material must flow) can be adjusted. This also has a flow controlling effect.

According to yet another alternative, a single ring may be mounted on the portion 23, this single ring being adjustable in a vertical direction in slides provided on the portion 23.

In some circumstances, the valving or controlling means provided causes material to back up in the hopper 20 and to this end four overflow ports 30 are provided which lead from the part 21 and then curve downwardly so that material falls directly into the casing 2.

As will clearly be seen from FIGURE 3, the floor 25 has a short vertical cylinder 31 upstanding towards the center part thereof and it is into this cylinder 31 that material flows from the portion 23. Ribs 32 run outwardly from the rod 27 to the cylinder 31.

The intermediate casing part 2A includes four outlet ducts 33. The outlet ducts 33 are directed vertically and communicate with the interior of the casing 2 through volutes 34 which have large area inlets 35 facing inwardly and smaller area outlets 36 leading directly into the ducts 33. Although four ducts 33 are shown, any number from two up can be provided and the ducts 33 may extend horizontally or at any other suitable angle. Simple rectangular ducts could be used instead of the volutes.

The area of each outlet 36 can be adjusted by means of cylinders provided in the ducts 33, each cylinder having an aperture in the walling thereof and being adjustable in its duct 33. One cylinder, reference 37, is shown at the right in FIGURE 3. This cylinder has an aperture 38 in the walling thereof and a screw threaded spigot 39 extending upwardly from a top wall 40. The spigot passes through the upper wall 41 of the duct 33 and through a disc 42 secured to the wall 41. Lock nuts 43 on the spigot 39 clamp a lever 44 and the disc 42 in a fairly loose manner, there being a gasket between these two components. A wing nut 45 threaded onto a small rod (not shown) upstanding from the disc 42 and a washer 46 serve to lock the lever 44 against rotation by clamping one edge portion of the washer against a protrusion 42A of the disc 42 and another edge portion against the lever 44. Upon the wing nut 45 being released the lever 44, and hence the cylinder 37 can be turned, whereby the effective area of the outlet 36 is varied by increasing or decreasing the degree of registry between the outlet 36 and the aperture 38. The small rod also serves as a stop for limiting motion of the lever 44 between the fully open and fully closed positions of the outlets 36.

In use of the distributor material enters through the hopper 20 and flows in controlled amounts through whatever valving arrangement is provided before falling onto the floor 25. Rotation of the shaft 12 of the motor 10 causes the entire structure, other than the casing 1 and parts fast therewith, to perform a horizontal gyratory motion and a simultaneous vertical oscillatory vibration and this has the effect of causing the material to flow outwardly from the center of the distributor towards the inlets 35 as is well understood in the art. The material thus enters the volutes 34 which lead from the inlets 35 to the outlets 36 and then flows downwardly through the ducts 33. Each port is connected to, for example, a material grader or separator.

As will be seen from the lower, left-hand part of FIGURE 1, a counter balancing spring 48 extends from an anchorage on the housing 9 to an anchorage on the casing 1. This arrangement can, if desired, be replaced by a counter balance weight (not shown) in the form of a ring bolted to the lower edge of the housing 9.

Gates (not shown) can be provided in addition to the cylinders 37, these gates being adapted for location across the inlets 35 whereby one or more of these inlets can be completely closed.

The cylinders 37 can be arranged for pneumatic or electrical actuation if so desired thereby to permit remote control.

The floor 25 of the casing 2A and the cone 22, which are the parts most subject to wear, can be designed as separable components for easy replacement if abrasion is severe. The cylinder 31 and the ribs 32 also function to limit the effects of abrasion. The area of these components is subjected to direct impingement by material dropping into the distributor. The cylinder 31 which inhibits outward movement of the lower layers of material, and the ribs 32 which inhibit their rotary movement, result in the creation of a cushion of material which protects this area of the floor 25 from abrasion due to impingement.

I claim:
1. A material distributor comprising an inlet port, a material receiving plate onto which material entering the distributor through said inlet port falls, means for imparting horizontal gyratory and vertical oscillatory motions to said plate and said inlet port to cause material present on said plate to be propelled evenly across the upper surface of the plate and to keep the material flowing through said inlet port, and a plurality of outlet ports disposed in an array radially outwardly of said plate to receive material from said plate.

2. A material distributor according to claim 1, in which said outlet ports are disposed in an array around the periphery of said plate.

3. A material distributor according to claim 2, in which said plate is in the form of an upright, shallow cone, and said inlet port is disposed above the apex of said cone.

4. A material distributor according to claim 2, in which each of said outlet ports leads to an outlet volute, and the end of each volute remote from said outlet port leads to a duct.

5. A material distributor according to claim 4, in which the upper surface of said plate is in the form of a shallow cone with said upper surface sloping downwardly in all directions from the apex of said cone.

6. A material distributor according to claim 1, wherein said material receiving plate has an upper surface onto which material entering the distributor through said port falls, and further comprising material flow restricting means for regulating the quantity of material distributed over said upper surface of said plate at any one instant thereby to prevent overloading of components downstream of the material flow restricting means.

7. A material distributor according to claim 6, in which said inlet port includes an elongated portion, the diameter of which changes throughout its length, and the flow restricting means includes an element the position of which in said elongated portion is adjustable thereby to vary the effective area of the flow path defined between said element and said elongated portion.

8. A material distributor according to claim 7, in which said portion is in the form of a frustrum of a cone and said element includes an upright cone.

9. A material distributor according to claim 1, wherein said material receiving plate is imperforate and has an upper surface, and wherein a duct leads downwardly from said inlet port and has its lower end at a short distance above said plate whereby a flow restricting, annular gap is formed between the lower end of said duct and said plate.

10. A material distributor according to claim 9, in which the lower part of said duct includes means for permitting said short distance to be varied thereby to permit variation of the effective area of said gap.

11. A material distributor according to claim 10, in which the lower part of said duct includes a ring which is vertically displaceable with respect to the remainder of the duct.

12. A material distributor comprising an inlet port, a material receiving plate onto which material entering the distributor through said inlet port falls, a plurality of outlet ports disposed in an array around the periphery of said plate to receive material from said plate, a motor connected to said plate and inlet port, the motor carrying eccentric weight means on its shaft whereby, upon rotation of the shaft, the shaft, the plate and the inlet port perform horizontal gyratory and vertical oscillatory motions, such motions causing the material to be propelled across said plate and distributed evenly to said outlet ports insofar as rate of flow through each port and insofar as particle size and shape are concerned and such motions also keeping the material flowing through said inlet port.

References Cited

UNITED STATES PATENTS

| | | | |
|---|---|---|---|
| 791,425 | 5/1905 | Johnson | 209—498 X |
| 2,284,671 | 6/1942 | Meinzer | 209—366.5 X |
| 2,601,534 | 6/1952 | Laffoon | 222—330 |
| 2,828,053 | 3/1958 | Kast | 209—366.5 X |
| 2,938,627 | 5/1960 | Hobart | 209—498 X |

FOREIGN PATENTS

| | | |
|---|---|---|
| 708,044 | 4/1965 | Canada. |
| 907,131 | 10/1962 | Great Britain. |
| 334,748 | 1/1936 | Italy. |

HARRY B. THORNTON, *Primary Examiner.*

TIM R. MILES, *Assistant Examiner.*